US009199404B2

(12) United States Patent
Pinato (10) Patent No.: US 9,199,404 B2
(45) Date of Patent: Dec. 1, 2015

(54) EXTRUSION BLOW MOULDING EQUIPEMENT WITH RECIPROCATING MOULDS MOVING "TO AND FRO" HAVING A SMALL FOOTPRINT (75) Inventor: Roberto Pinato, Jesil (IT)

(73) Assignee: DINAMICA 3000 S.R.L., Bologna (IL)

( * ) Notice: Subject to any disclaimer, the term of this patent is extended or adjusted under 35 U.S.C. 154(b) by 0 days.

(21) Appl. No.: 14/344,994

(22) PCT Filed: Sep. 11, 2012

(86) PCT No.: PCT/IB2012/001775
§ 371 (c)(1),
(2), (4) Date: Mar. 14, 2014

(87) PCT Pub. No.: WO2013/038257
PCT Pub. Date: Mar. 21, 2013

(65) Prior Publication Data
US 2014/0227384 A1 Aug. 14, 2014

(30) Foreign Application Priority Data
Sep. 14, 2011 (CH) ........................ 1520/11

(51) Int. Cl.
B29C 49/04 (2006.01)
B29C 49/42 (2006.01)
B29C 49/32 (2006.01)

(52) U.S. Cl.
CPC ............... B29C 49/04 (2013.01); B29C 49/32 (2013.01); B29C 49/421 (2013.01); B29C 2049/048 (2013.01)

(58) Field of Classification Search
CPC .................. B29C 2049/048; B29C 2049/283; B29C 49/32

USPC ............................................ 425/538
See application file for complete search history.

(56) References Cited

U.S. PATENT DOCUMENTS 4,552,526 A  11/1985  Hafele
5,458,479 A * 10/1995  Minghetti .................. 425/503
(Continued)

FOREIGN PATENT DOCUMENTS

DE  27 03 527 A1  8/1978
EP  0 597 385 A1  5/1994
(Continued)

OTHER PUBLICATIONS

Derwent abstract of Hansen (DE 2703527 A1) dated Aug. 1978.*
International Search Report, dated Jan. 22, 2013, from corresponding PCT application.

Primary Examiner — Robert B Davis
(74) Attorney, Agent, or Firm — Young & Thompson (57) ABSTRACT A linear machine for blow molding hollow bodies includes: an extruder feeding a head for extruding juxtaposed parisons lying on an imaginary vertical plane parallel to or coincident with the imaginary plane containing the longitudinal axis of the extruder itself; mold and counter-mold assemblies with respective grippers which can be alternately moved along an axis contained in the imaginary vertical plane of the extrusion head itself; and a unit for transferring the containers cyclically formed by the molds onto a single conveyor located laterally to the path of the mold and counter-mold assemblies. The conveyor resides longitudinally under the extruder. The mold and counter-mold assemblies can move horizontally. Components cyclically and linearly raise and lower the extruder and/or the head, preventing the parison products from interfering both with each other and with the molds as they come out in a closed condition due to the cooperation with the extrusion head.

20 Claims, 9 Drawing Sheets

(56) References Cited

U.S. PATENT DOCUMENTS

| | | | |
|---|---|---|---|
| 5,639,415 A * | 6/1997 | Kato et al. | 264/532 |
| 6,971,864 B2 * | 12/2005 | Messner | 425/135 |
| 2004/0115291 A1 | 6/2004 | Messner | |
| 2010/0276850 A1 | 11/2010 | Muller | |
| 2012/0086156 A1 * | 4/2012 | Mathy et al. | 264/572 |

FOREIGN PATENT DOCUMENTS

| | | |
|---|---|---|
| WO | 02/081180 A1 | 10/2002 |
| WO | 2009/086651 A1 | 7/2009 |

\* cited by examiner

EXTRUSION BLOW MOULDING EQUIPEMENT WITH RECIPROCATING MOULDS MOVING "TO AND FRO" HAVING A SMALL FOOTPRINT

BACKGROUND OF THE INVENTION

Field of the Invention

Figure 1A:
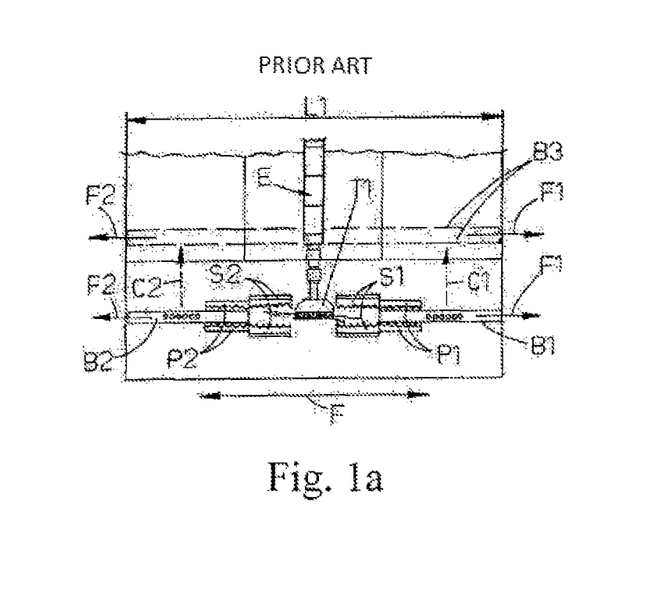
FIGS. 1a and 1b schematically show two types of linear machines for blow moulding containers or other hollow bodies from a thermoplastic material according to the prior art.
Figure 1B:
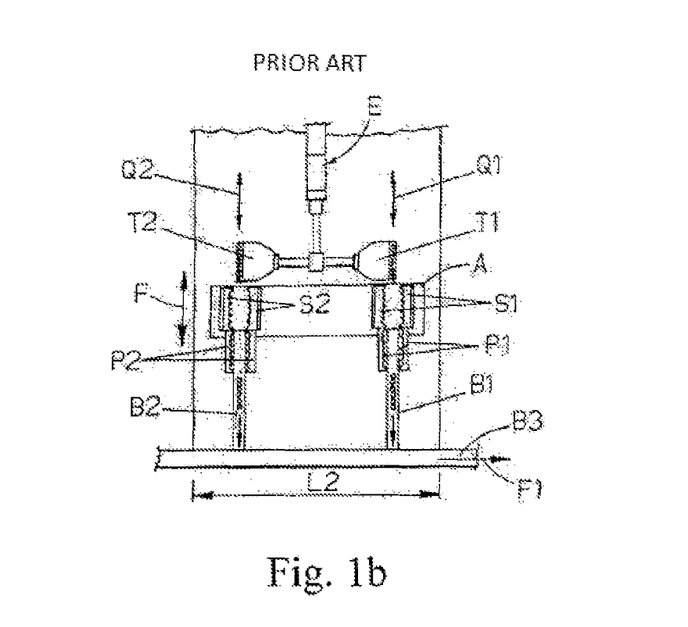

The present invention relates to a linear machine for blow moulding bottles, flasks and more generally hollow bodies from a thermoplastic material, characterized by both a high hourly production rate and plan dimensions much smaller than those of the current machines with a similar throughput as illustrated in a schematic top plan in FIGS. 1a and 1b of the accompanying drawings.

DESCRIPTION OF THE RELATED ART

The traditional linear blow moulding machines such as those shown in FIGS. 1a and 1b, for example, generally comprise an extruder and an extrusion head for extruding tubular semi-finished products generally known as "parisons".

Specifically, in the machine of FIG. 1a, reference numeral E denotes the extruder, and reference numeral T1 denotes the head which is fed by the extruder and from which the extruded parisons are dropped with a vertical arrangement and in alignment with an imaginary plane which is perpendicular to the longitudinal axis of said extruder. Mould and counter-mould assemblies S1, S2 are provided laterally to the head T1 on the respective sides thereof, said mould and counter-mould assemblies being able to be alternately moved, in the direction indicated by the double arrow F, from a position under the head T1 to take lengths of parison therefrom to their initial outward position. In said position, the mould and counter-mould assemblies S1, S2 cooperate with upper blowing means of a known type (not shown) where the blow-moulded containers are maintained in a hang condition. Then, each mould and counter-mould assembly can be opened and returned to its initial position where it cooperates with the head T1 for running a new cycle. Usually, the two components of each mould and counter-mould assembly have associated therewith grippers P1 and P2 which grip the containers hanging from the blowing station when the assembly S1 or S2 is closed for grabbing the parisons from the head T1, so that when the mould and counter-mould assembly comes out in a closed condition due to the cooperation with said extrusion head T1, the containers formed in a previous cycle are transferred by the grippers P1, P2 onto conveyors B1, B2 traveling in opposite directions F1, F2 to move the containers away. In this type of machines, if needed, the products discharged by the grippers P1 and P2 can be also transferred, by known means as schematically indicated by arrows C1, C2 in FIG. 1a, onto a single transverse conveyor B3 which can discharge the products formed by the two assemblies S1, S2 as a single flow coming out in a single direction, either to the right F1 or to the left F2. The plant dimensions of a machine as shown in FIG. 1a are influenced by the considerable width L1 of the machine. The type of blow moulding machine as shown in FIG. 1b, having a throughput identical to that of the machine of FIG. 1a, is substantially halved in plant dimensions because of its decreased width L2. This is because the extruder E is feeding two heads T1 and T2 which are located on the respective sides of the extruder and which are parallel both to each other and to the longitudinal axis of the extruder with their major dimension. A single wagon A reciprocating in the direction of arrow F has mounted thereon two mould and counter-mould assemblies S1, S2, along with respective grippers P1, P2, which can be translated from the rest position or cooperation position with the blowing means as illustrated in FIG. 1b, to a cooperation position with the heads T1 and T2 in order to pick those lengths of parison required for the production of containers therefrom. As in the previous case, the containers formed at the blowing stations in a previous cycle are cyclically gripped by the grippers P1, P2 and transferred onto conveyors B1 and B2 which may converge into a single conveyor B3 discharging the containers as a single stream in a single predetermined direction, for example to the right as indicated by F1.

The Applicant has noted that the blow moulding machines of the linear type such as those described above have considerable plan dimensions, and that a reduction in plan dimensions significantly reduces the throughput.

Therefore, the Applicant has undertaken efforts to address the technical problem of providing a linear-type blow moulding machine which is considerably decreased in plan dimensions while having a hourly production rate identical to that of the machines of the type as previously discussed according to the prior art, or which can substantially twice the throughput or otherwise considerably increase it while being identical to the machines of the prior art in plan dimensions.

The Applicant has also noted that the blow moulding machines of the linear type such as those described above are designed and constructed substantially such as to be able to make a more or less wide range of products.

In other words, the machines are dimensioned so that the three main parameters, i.e. the biasing force of the blowing nozzles, the travel of the wagons operatively associated with the extrusion head, and the clamping force of the mould-carrying presses, are suitable for a predefined range of products to be made by the machines.

The above-mentioned three parameters determine the characteristics of the blowing assemblies, wagons and mould-carrying presses. It results that, when it is required to make a product whose dimension is not included within the predefined range for which the machine was initially projected, the machine or a portion thereof has to be designed ex novo.

Furthermore, it should be considered that the operation of dimensioning a machine suitable for making a wider range of products will require to oversize the blowing assemblies, wagons and mould-carrying presses, resulting in increased production costs and a reduced hourly production rate due to the increased mass to be handled.

SUMMARY OF THE INVENTION

Therefore, the Applicant has undertaken efforts to address the technical problem of providing a linear-type blow moulding machine which is modular and therefore able to modify, in a relatively simple and quick manner, one of the above-mentioned three assemblies in order to enable or optimize the manufacture of products which are different from those for which the machine was originally designed.

In a first aspect the present invention relates to a linear machine for blow moulding containers or other hollow bodies from a thermoplastic material, the machine being of a type comprising:

- at least one extruder (E) extending along an axis of extension (X-X);
- at least one extrusion head (T1) fed by said at least one extruder and arranged laterally to said at least one extruder with respect to its axis of extension (X-X); said extrusion head (T1) comprising a plurality of juxtaposed extrusion mouths, each adapted to extrude at least one parison;

characterized by comprising at least one module (M1) operatively arranged below said extrusion head (T1), said module comprising:

at least one pair of mould and counter-mould assemblies (S1, S2), each pair being operatively associated with an extrusion head (T1);

at least one pair of blowing stations adapted to blow air into the parison to form containers;

at least one pair of grippers (P1, P2) for handling the containers as blown by the blowing stations;

at least one conveyor (B3) for conveying the container products away from the machine; said conveyor (B3) extending along a direction of extension (Z-Z) which is substantially parallel to the axis of extension (X-X) of said extruder (E) and being positioned vertically below said extruder (E);

the mould and counter-mould assemblies (S1, S2) of each pair, along with to the respective grippers (P1, P2), can be alternately moved along an axis which is substantially parallel to both the axis of extension (X-X) of said extruder (E) and the axis of extrusion of said extrusion head (T1).

According to another aspect the present invention relates to a linear machine for blow moulding containers or other hollow bodies from a thermoplastic material, the machine being of a type comprising:

at least one extruder (E) extending along an axis of extension (X-X)

at least one extrusion head (T1) fed by said at least one extruder and arranged laterally to said at least one extruder with respect to its axis of extension (X-X);

said extrusion head (T1) comprising a plurality of juxtaposed extrusion mouths, each adapted to extrude at least one parison;

said machine comprising at least one module (M1) operatively arranged below said extrusion head (T1), said module comprising:

at least one pair of mould and counter-mould assemblies (S1, S2), each pair being operatively associated with an extrusion head (T1); each mould and counter-mould assembly comprising:

at least one press assembly comprising a mould and a counter-mould adapted to define a moulding cavity; and a carriage for handling the press assembly in a direction substantially parallel to the direction of the axis of extension (X-X) of said extruder (E);

at least one pair of blowing stations adapted to blow air into the parison to form containers;

at least one conveyor (B3) for collecting and moving the containers formed by said module (M1) away from the machine characterized by comprising detachable coupling means for integrally coupling said press assembly with said handling carriage.

The present invention, in the afore said aspect, may present at least one of the preferred characteristics herein after described.

Preferably, each extrusion head comprises a plurality of extrusion mouths arranged according to an axis which is substantially parallel to the axis of extension X-X of said extruder.

Advantageously, the machine comprises a handling assembly for vertically translating said extruder or at least one portion thereof in a direction which is substantially parallel to its axis of extension (X-X).

Preferably, the handling assembly comprises:
at least one supporting frame for said extruder;
at least one supporting bridge for supporting said extruder;
at least two jacks operatively connected to said supporting frame for vertically translating said supporting bridge with respect to said supporting frame;
at least one motor for driving said jacks.

Conveniently, the handling assembly cyclically raises and lowers the extruder (E) in a vertical direction so as to prevent the parison products from interfering with the mould and counter-mould assemblies as they come out in a closed condition due to the cooperation with said extrusion head, and there being provided means for preventing the parisons leaving said extrusion head (E) from swinging and therefore either potentially contacting each other or forming bottles poor in quality, during this cyclical movement of lowering and lifting of said components (E and/or T1).

Preferably, the conveyor (B3) for collecting and moving away the container products is provided with grasping heads (D1, D2) arranged on an axis parallel to that of said extruder (E).

Advantageously, the machine may comprise a second head (T2), arranged parallel and opposite to said head (T1) with respect to the axis X-X on the other side of the extruder, under which a second module (M2) is arranged along with respective mould and counter-mould assemblies (S1', S2') and respective grasping heads (D1', D2') for discharging the containers formed by the second module (M2) onto the same collecting and handling conveyor (B3) positioned under the extruder (E).

Preferably, the grasping heads (D1, D1', D2, D2') are mounted in pairs to at least one handling device which alternately moves the grasping heads between a pick-up area located at an axis parallel to the axis X-X and passing through the extrusion head (T), and a drop-off area at the collecting and handling conveyor (B3) where the containers are dropped.

Conveniently, the grasping heads (D1, D1', D2, D2') are mounted in pairs to a single handling device which alternately moves the grasping heads between a pick-up area located at an axis parallel to the axis X-X and passing through the extrusion head (T), and a drop-off area at the collecting and handling conveyor (B3) where the containers are dropped.

Alternatively, the grasping heads (D1, D1', D2, D2') are mounted in pairs to two separate handling devices.

Preferably, each carriage of a pair of modules M1 and M2 is timingly moved with the other carriage of the same pair in order to alternately move the respective press assembly under the extrusion head (E).

Advantageously, each carriage of a pair is moved along paths which are aligned to but separated from each other.

Preferably, the machine has decoupling means for allow the blowing stations and the press assemblies to be removed from the remainder of the machine.

Conveniently, the machine may include a third head (T2'), under which a third module (M3) is arranged along with respective mould and counter-mould assemblies (S1", S2") and respective grasping heads (D1", D2") for discharging the containers formed onto the same collecting and handling conveyor (B3) which is already operatively associated to the modules M1 and M2.

Preferably, the machine may include a fourth head (T1'), under which a fourth module (M1') is arranged along with respective mould and counter-mould assemblies (S1", S2") and respective grasping heads (D1", D2") for discharging the containers formed onto the same collecting and handling conveyor (B3) which is already operatively associated to the modules M1, M2 and M2'.

BRIEF DESCRIPTION OF THE DRAWING FIGURES

Further characteristics and advantages of the invention will be more evident from the detailed description of some preferred embodiments, but not exclusive, of a linear blow moulding machine according to the present invention. Such a description will be hereinafter explained referring to the attached drawings, provided for purposes of illustrations only, and thereby not limitative, wherein.

DETAILED DESCRIPTION OF THE INVENTION

The Applicant has found that the machine according to the invention can provide a machine which can be modulated according to the varying production requirements with substantially extremely reduced plan dimensions.

With reference to FIGS. 3-9, a linear machine for blow moulding containers or other hollow bodies according to the present invention is identified with reference numeral 100.

In virtue of the reduced plan dimensions of such a machine, it is suitable to be shipped in a Euro-standard container with its main components already mounted and ready to operate, resulting in great advantages.

Figure 3:
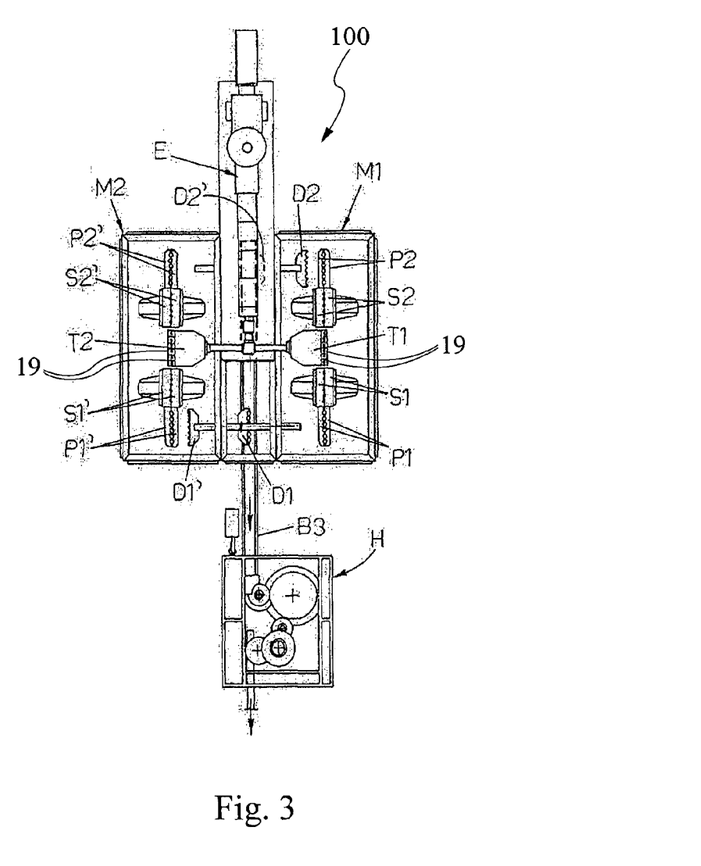
FIG. 3 is a plan view schematically showing a second embodiment of the machine according to the invention with four mould and counter-mould assemblies.

With reference to the embodiment as shown in FIG. 3, a linear machine 100 for blow moulding containers or other hollow bodies from a thermoplastic material comprises: an extruder E feeding an extrusion head T1 comprising a plurality of mouths 19 for extruding parisons, and at least one module M1.

With reference to the embodiment of FIG. 3, the extrusion head T1 is positioned on a side of the extruder E with the mouths 19 for extruding the parisons which are substantially juxtaposed with each other and parallel to the axis of extension X-X of the extruder E.

In other words, the extruder E extends along an axis of extension X-X and the extrusion head T1 is arranged laterally to the extruder E with respect to the axis of extension X-X with the extrusion mouths arranged substantially parallel to such an axis of extension X-X.

The module M1 is provided with guide-and-drive means, preferably of an electrical type, for alternately moving a pair of mould and counter-mould assemblies S1, S2, along with respective grippers P1 and P2, in a direction parallel to the axis of extension of the extruder E as indicated by arrow F. The mould and counter-mould assemblies S1, S2 as well as the respective grippers P1 and P2 are assemblies known to those skilled in the art because they are usually employed in linear machines for blow moulding containers or other hollow bodies, and therefore they are not described hereinbelow in further detail.

Each pair is operatively associated with an extrusion head T1; each moulding assembly S1, S2 is opposite to the other moulding assembly S1, S2 of the same pair with respect to an extrusion head T1.

Figure 9A:
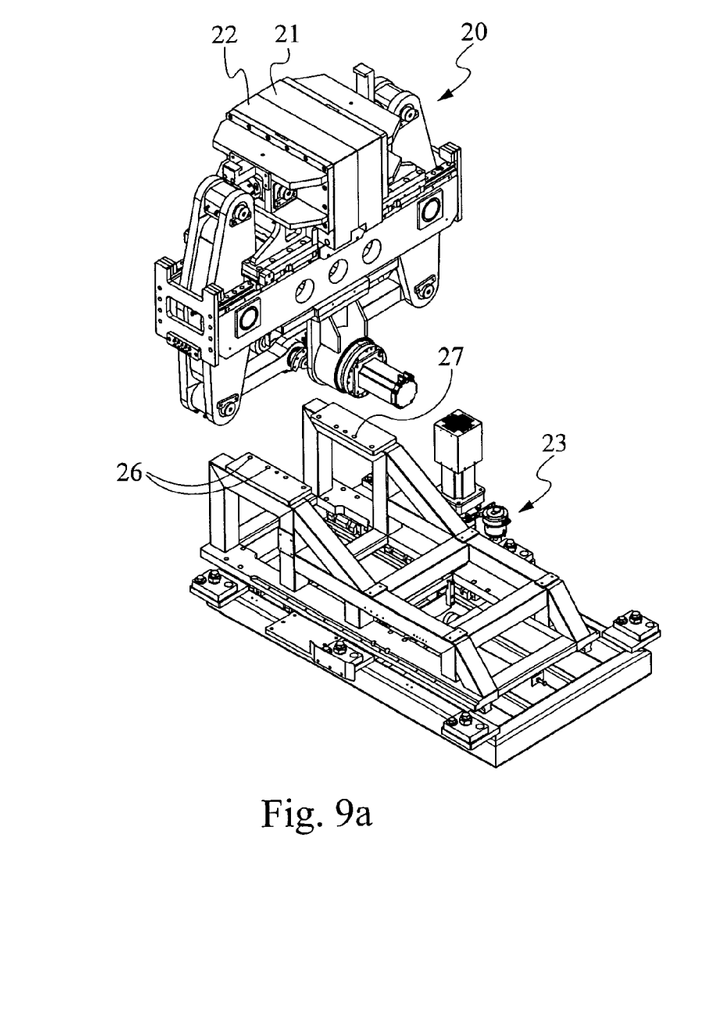
FIGS. 9a and 9b are also schematic, partially exploded views of a mould and counter-mould assembly comprising a press assembly and a carriage for moving the press assembly according two different perspectives, respectively.
Figure 9B:
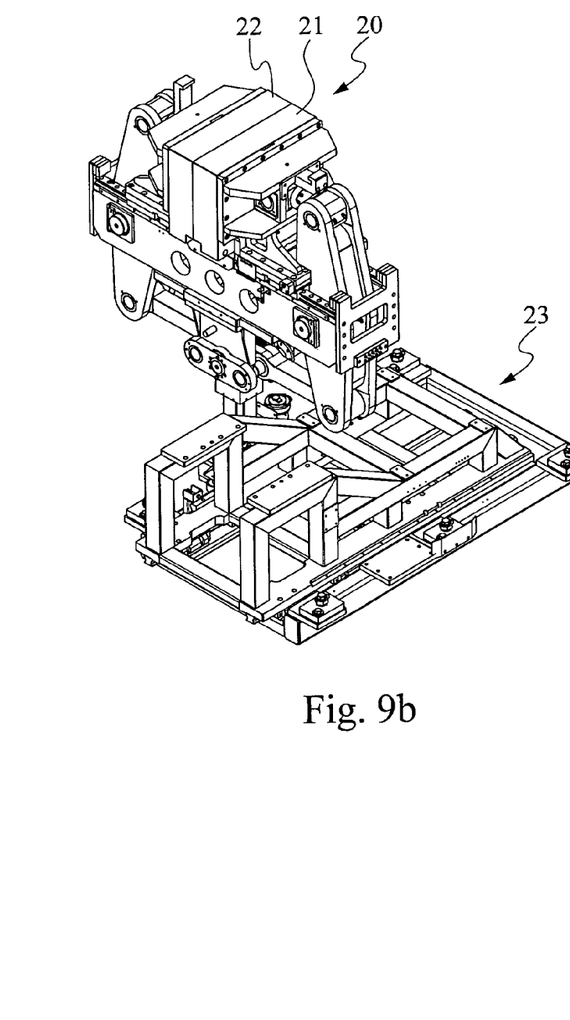

As best seen in FIGS. 9a, 9b, each moulding assembly S1, S2 has a press assembly 20 comprising a mould 21 and a counter-mould 22 cooperating to define a moulding cavity, and a carriage 23 for moving the press assembly 20 in a direction substantially parallel to the axis of extension (X-X) of said extruder (E);

Furthermore, the machine 100 has at least one pair of blowing stations 24 adapted for blowing air into the parisons in order to form containers 25.

The blowing stations 24 are located axially outwardly with respect to the extrusion head T1, and each extrusion head is provided with two blowing stations 24.

The machine 100 also includes at least one conveyor (B3) for collecting and moving the containers formed by said module (M1) away from the machine.

The conveyor B3 for collecting and moving away the containers is arranged below the extruder, and preferably it extends parallel to the axis of extension X-X of the extruder E.

The conveyor B3 for collecting and moving away the container products is provided with grasping heads D1, D2 arranged on an axis parallel to that of said extruder (E).

The grasping heads D1, D2 are of either a suction type or a mechanical type, for example.

For each pair, the mould and counter-mould assemblies S1, S2 as well as the respective grippers P1 and P2 are arranged opposite to each other with respect to the extrusion head T1.

The mould and counter-mould assemblies S1 and S2 are alternately moved between a position under the extrusion head T1 for grabbing lengths of parison, and a position under the respective external blowing stations 24 for transforming the parisons into containers 25.

Specifically, the moulds S1 and S2 are alternately moved under the extrusion head T1 to grab lengths of parison and move them under the respective blowing stations 24 which are positioned axially outwardly with respect to the extrusion head T1.

Then, the containers formed by the blowing stations 24 are gripped by the grippers P1 and P2 which will move them even more axially outwardly with respect to the extrusion head, up to a position adapted for the cooperation with grasping heads D1, D2 which will transfer the rows of containers onto the conveyor B3 which is preferably positioned under the extruder E with its longitudinal axis parallel to the axis of extension of the extruder, and preferably on the same imaginary vertical plane containing the longitudinal axis of the extruder.

The containers will leave the conveyor B3 as one single flow, for example in the direction indicated by arrow F1. The mould and counter-mould assemblies S1 and S2 are moved along a horizontal path. In order to prevent the mould and counter-mould assemblies from interfering with the parisons leaving the extrusion head, the extruder and/or at least the extrusion head or a portion thereof will be provided with the ability of being appropriately moved up and down.

Particularly, the provision of said up-and-down movement is such that the lower level of the portion of the head T1 carrying the mouths 19 for discharging the parisons always remains in a horizontal position while the parisons Z always remain vertical and perpendicular to said lower level of the head T1, so as to prevent relative movements which could lead them to contact each other.

In order to solve this problem, the prior art teaches to swing the extruder about a transverse axis so as to cause the extruder and the extrusion head to pitch. In the machine according to the invention, in order to prevent the parisons from potentially swinging due to the pitching movement of the extruder, it is contemplated to impart a vertical, rectilinear movement to the extruding assembly. To this end, according to the embodiments shown in FIGS. 2-5 and 8a-8c, it is contemplated to mount the extruder E on a handling assembly for vertically translating said extruder E or at least one portion thereof in a direction which is substantially parallel to its axis of extension (X-X).

The handling assembly comprises at least one supporting frame for said extruder E;
  at least one supporting bridge for supporting said extruder;
  at least two jacks, preferably four, operatively connected to said supporting frame for vertically translating the supporting bridge and therefore the extruder with respect to the supporting frame.

Preferably, each jack is provided with a special motor for its actuation.

Differently from the prior art, said vertical handling means 10 are positioned in the upper portion of the supporting frame so as to leave completely clear the lower part of the extruder E under which said conveyor B3 for discharging the containers formed by S1, S2 can be positioned.

Figure 6:
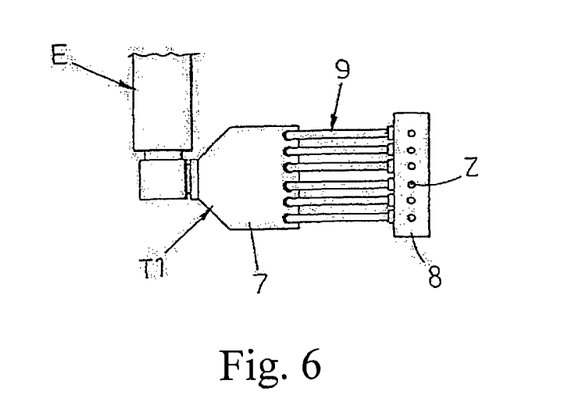
FIGS. 6 and 7 are a plan view and a front elevation view showing a further embodiment of the machine according to the present invention in which the extrusion head, and particularly a portion thereof associated with the extruder, is adapted for being moved vertically with respect to the extruder.
Figure 7:
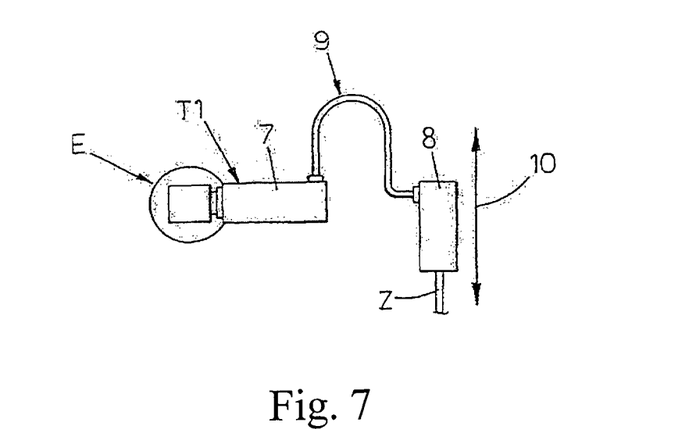
Figure 8A:
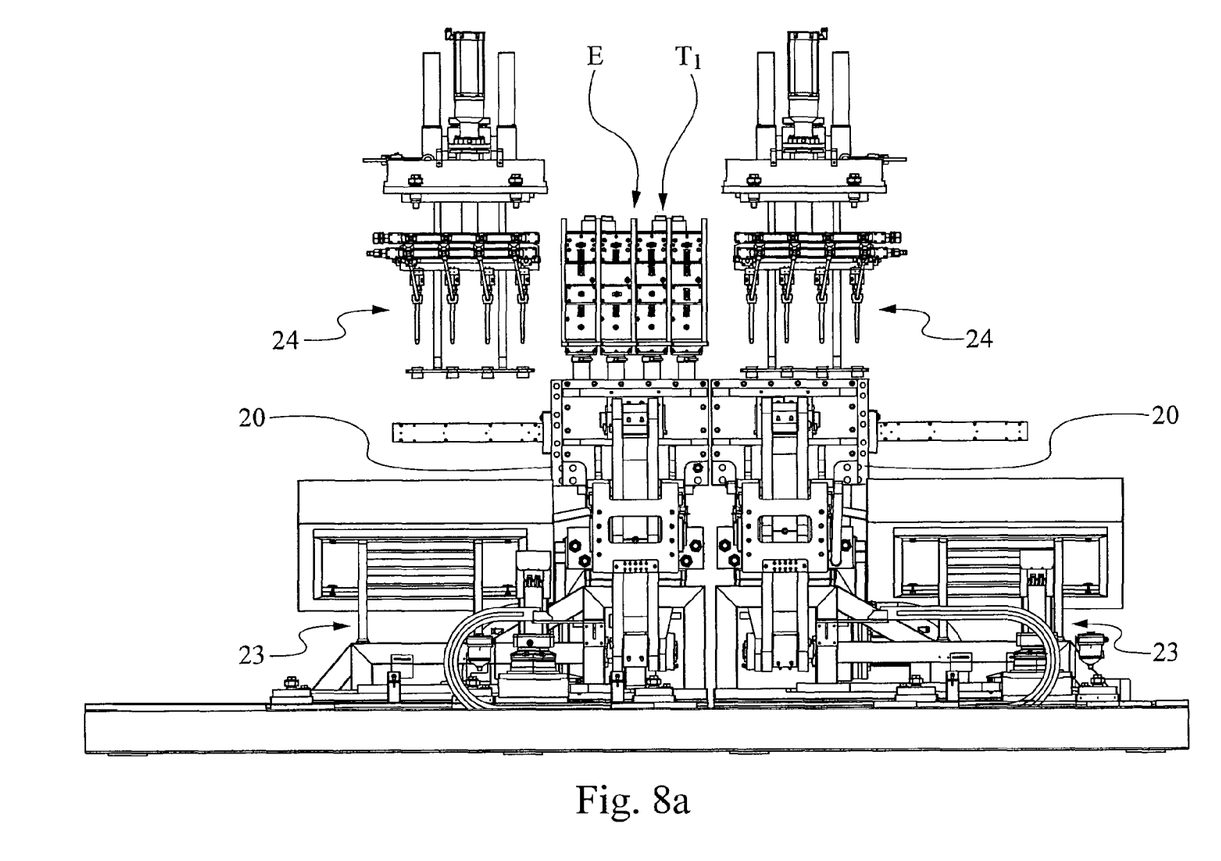
FIGS. 8a, 8b and 8c are also schematic front elevation views of the system of FIG. 2 according to three different production steps, respectively.
Figure 8B:
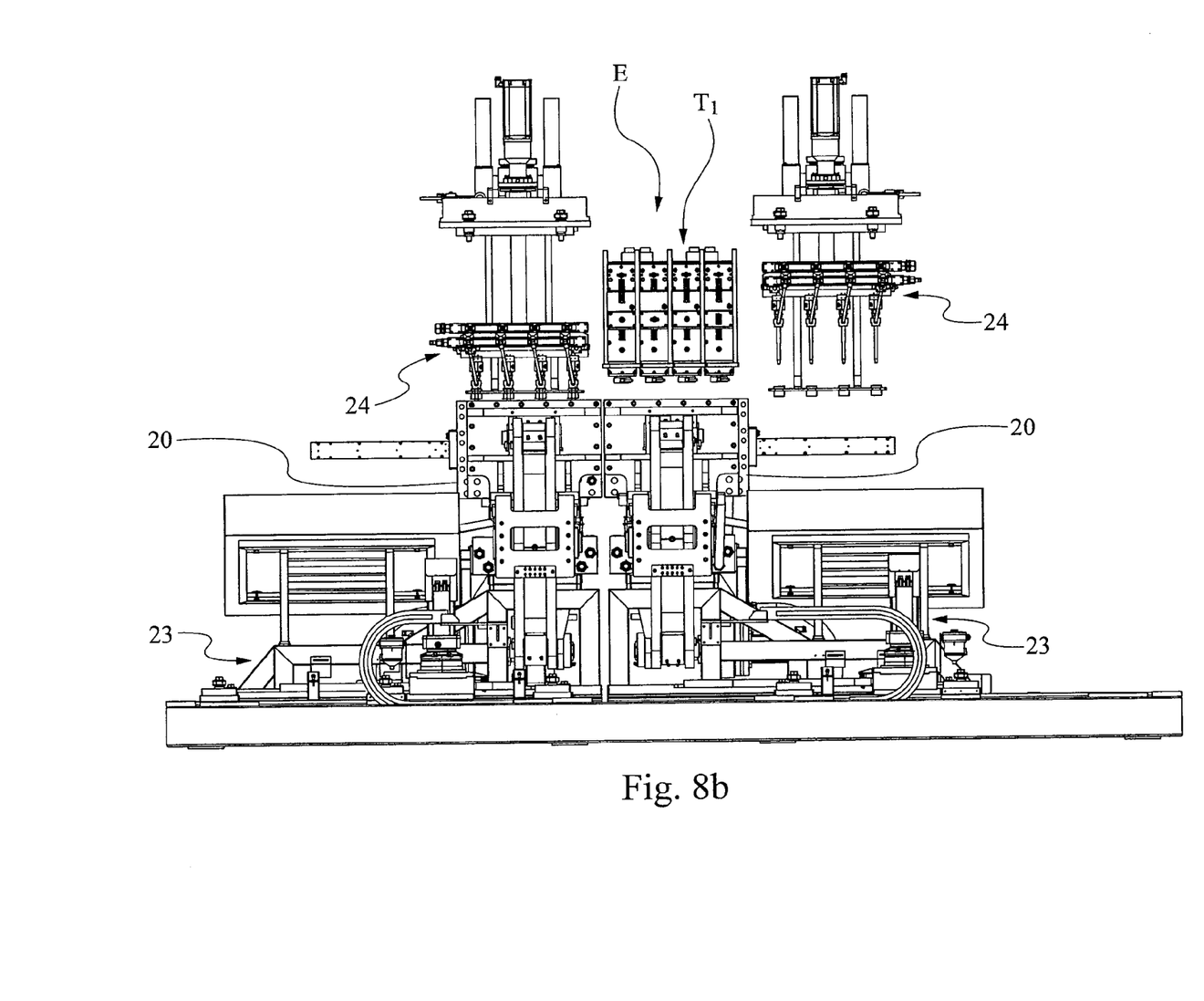
Figure 8C:
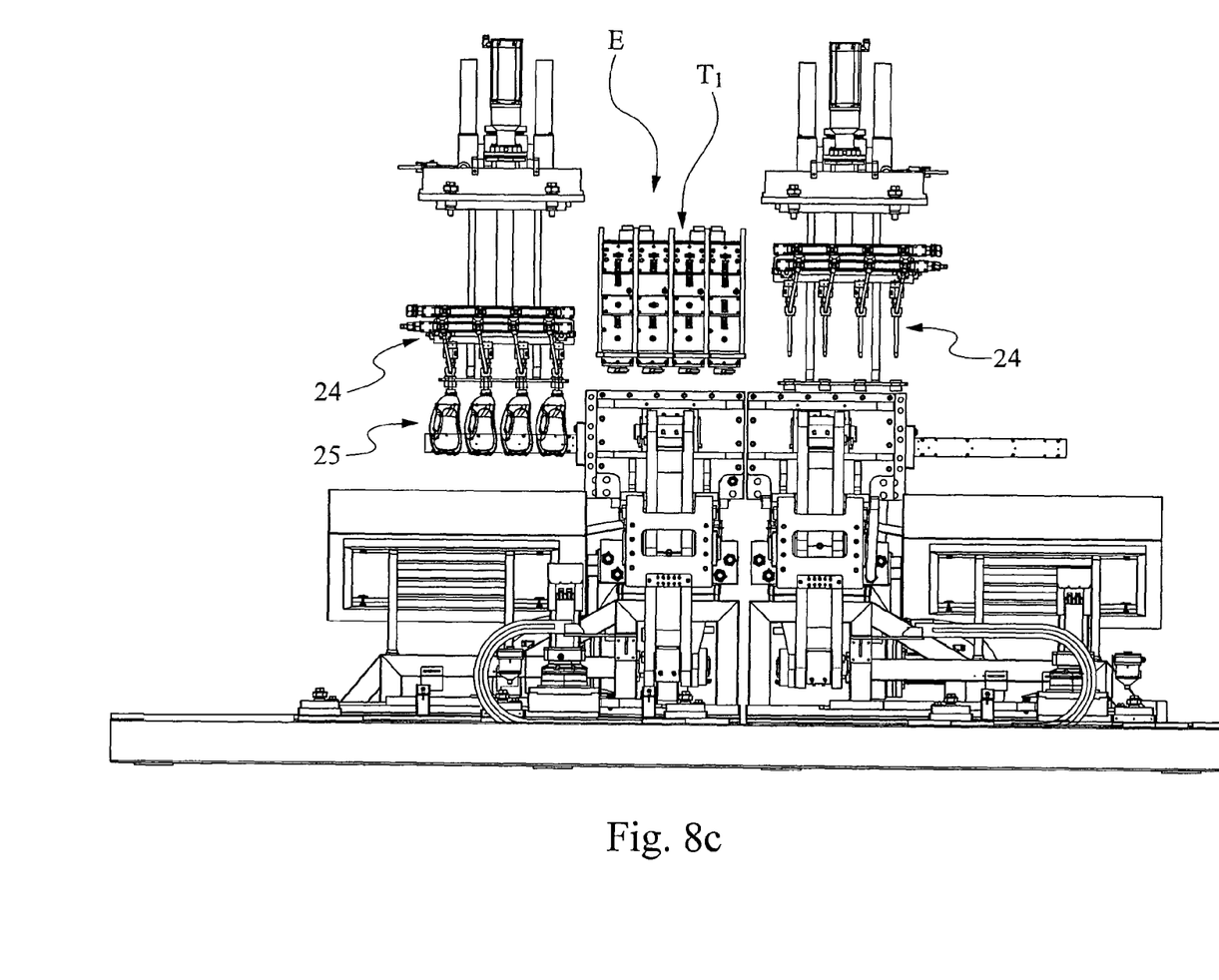

As shown in FIGS. 6 and 7, another solution provides to hold stationary the extruder E and a first portion 7 of the extrusion head T1 which is connected to the same extruder and adapted for dividing the flow of plastic material among the channels for forming the plurality of parisons. The end portion 8 of the extrusion head, which includes the mouths for extruding the parisons Z, is connected to the outputs of said first portion 7 of the head by means of respective armored, high-temperature resistant hoses 9, for example of the same type as employed in the delivery heads for hot glues or hot melt adhesives. This solution allows only to vertically move the end portion of the parison-extrusion head 8, which is very light and therefore suitable to be operated in a simplified manner, with the use of said means 10. The vertical handling means 10 are not illustrated in detail as they are readily achievable by a person skilled in the art based on the information previously provided herein.

According to an important aspect of the present invention the machine comprises detachable coupling means for integrally coupling said press assembly 20 with said handling carriage 23.

The coupling means are embodied by screws and bolts adapted for engaging first coupling holes 26 in order to couple the press assembly with the handling carriage.

The coupling means also have centering holes 27 and reference pegs to be fitted into said centering holes 27 with a close tolerance in order to ensure that the press assembly 20 and the handling carriage 23 are centered.

In order to increase the flexibility and modularity of the machine, each carriage 23 of a pair, i.e. each carriage operatively associated to the same extrusion head T1, is moved along a path which is substantially aligned with but separated from the path of the other carriage 23.

In the embodiment shown in the Figures, the paths are embodied by two pairs of rails along which the handling carriages 23 are moved, each pair of rails being arranged substantially parallel to the axis of extension X-X of said extruder E.

Thus, the travel of the carriages can be increased, and consequently the dimension in length of the mould and counter-mould on the press assembly can be increased.

The increased dimension in length of the mould and counter-mould enables the production of more containers during the same travel, thereby increasing the hourly throughput of the machine.

In order to further increase the flexibility and modularity of the machine, it is disclosed that there are second decoupling means which allow the blowing stations 24 to be moved and removed with respect to the main frame.

To this end, the blowing stations 24 are mounted to removable frames which are in turn attached to the main frame with the use of known means such as screws, bolts and holes or other equivalent means.

Once the removable frame has been removed from the main frame, the blowing station can be easily replaced with a blowing station having a different blowing power in order to make different containers.

In FIG. 3 there is shown an alternative embodiment of the machine according to the present invention with two extrusion heads T1, T2.

Figure 2:
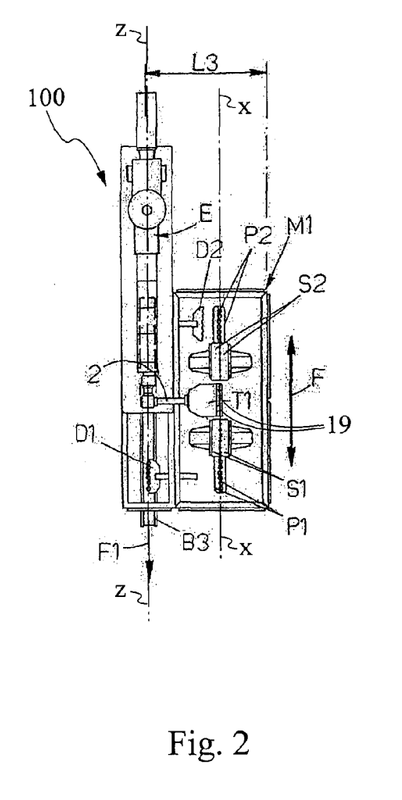
FIG. 2 is a plan view schematically showing a first embodiment of the machine according to the invention with two mould and counter-mould assemblies.

From FIG. 3 it is noted that when the extruder is provided with a second lateral extrusion head T2 which is opposite, parallel and symmetrical to the extrusion head T1 as in the machine of FIG. 2, and when a respective module M2 identical and specular to the module M1 is positioned under this additional head T2 along with respective mould and counter-mould assemblies S1', S2', respective grippers P1', P2' and respective grasping heads D1', D2', since the conveyor B3 is located equidistantly between the modules M1, M2, the containers formed by the additional module M2 with the additional extrusion head T2 can be discharged onto the same conveyor B3. The mould and counter-mould assemblies S1, S2, S1', S2' of the modules M1, M2 and/or the respective grasping heads D1, D2, D1', D2' should be operated with a time shift such that the containers produced by the two juxtaposed units can be discharged, without interference, onto the common collecting and handling conveyor B3 which, in this case, delivers a flow of containers which can be directly fed to a filling and capping machine H, for example of a carousel or other high-throughput type. The machine according to the lay-out of FIG. 3 has substantially extremely reduced plan dimensions while being more than double in hourly production rate because it is equipped with twice the number of mould and counter-mould assemblies S1, S2, S1', S2'.

Figure 4:
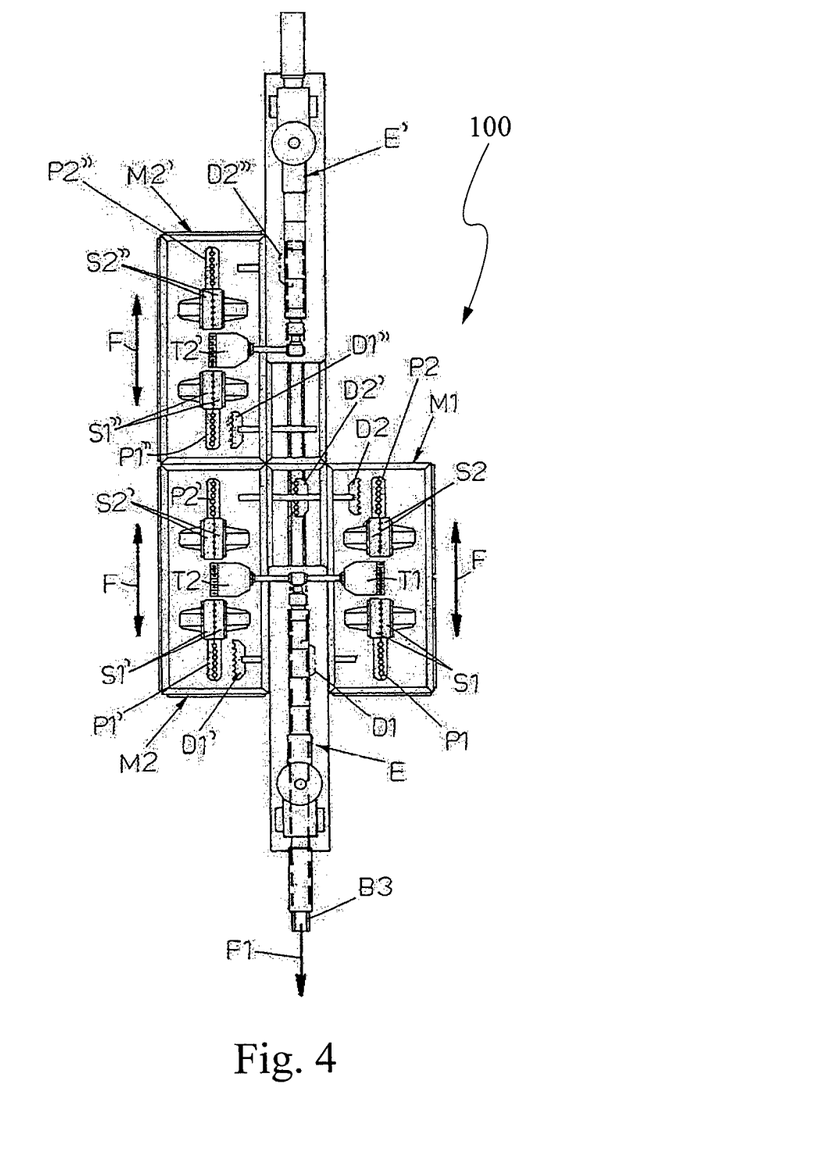
FIG. 4 is a plan view schematically showing a third embodiment of the machine according to the invention with six mould and counter-mould assemblies.

In FIG. 4 there is shown an alternative embodiment of the machine according to the present invention with three extrusion heads T1, T2, T2'.

The machine of FIG. 4 has been created by combining the lay-outs of FIG. 2 and FIG. 3.

In other words, by combining the lay-outs of FIG. 2 and FIG. 3 along with their respective extruders E, E', it is possible to obtain a machine having a lay-out with three heads T1, T2, T2' and three modules M1, M2, M2' moving six mould and counter-mould assemblies S1, S2, S1', S2', S1'', S2'', thereby significantly increasing the production throughput.

Figure 5:
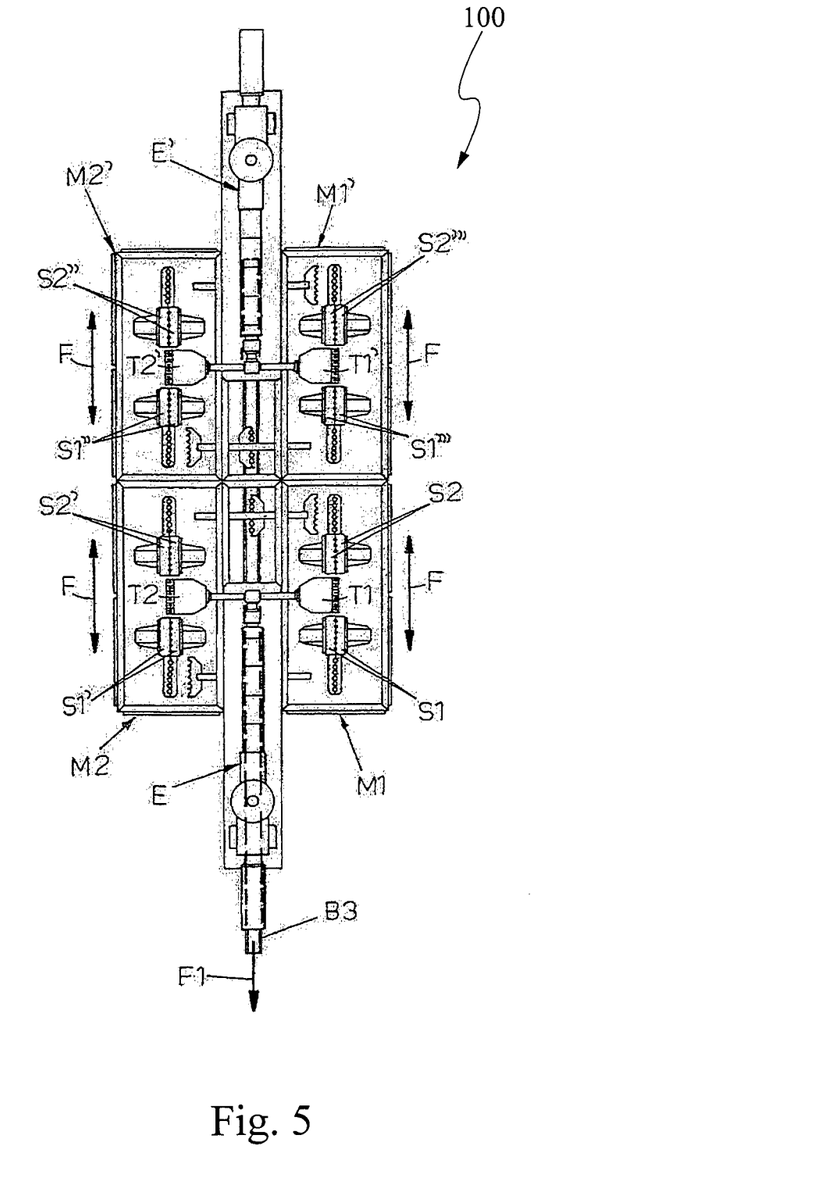
FIG. 5 is a plan view schematically showing a third embodiment of the machine according to the invention with eight mould and counter-mould assemblies.

In FIG. 5 there is shown an alternative embodiment of the machine according to the present invention with four extrusion heads T1, T2, T1', T2'.

In other words, by combining two machines as in FIG. 3 along with their respective extruders E, E', it is possible to obtain a machine having the lay-out of FIG. 5 and provided with four extrusion heads T1, T2, T1', T2' and four modules M1, M2, M1', M2' moving eight mould and counter-mould assemblies S1, S2, S1', S2', S1'', S2'', S1''', S2''', which is therefore capable of a high hourly production rate which makes it able to compete with the rotary machines, but with the advantageous ability of calibrating the necks of the containers and exchanging the format in an extremely quick manner. Both in the version with six mould and counter-mould assemblies and in the version with eight mould and counter-mould assemblies, the containers produced by the various assemblies can be collected and removed by a common conveyor B3 or by a set of juxtaposed conveyors characterized by providing one unidirectional flow of containers which may be fed directly to one or more high-speed filling machines. In the machines with opposite heads as shown in FIGS. 3 to 5, the opposite grasping heads D1, D1' and the other grasping heads can be moved by common means. The advantages resulting from the machine according to the invention can be summarized in the following manner:

a) the machine makes use of sectional modules M1, M2, M3, M4 which can compose machines with one, preferably two and up to a maximum of eight mould and counter-mould assemblies to meet the small, medium and large production requirements so as to be able to compete with the large rotary moulding machines, but with the advantages as previously set forth herein;

b) in the simplest version as from FIG. 2, the machine can be shipped in an Euro-standard container in an already mounted, ready-to-operate state, with the resulting advantages expected therefrom;

c) the provision of the removable coupling means allows to obtain modular machines having the above modularity and assembling ability which enable to maximize the use of common components, thereby improving the spare part management and reducing the production and use costs;

d) the product is formed by a single production line, thereby simplifying the end of the production line and being able to directly associate high-throughput fillers;

e) the modularity of the system enables the use of closing forces for the moulds, travels for the mould carriage and thrust forces for the blowing nozzles which can be varied and related to both the type of container to be formed and the production throughput of each mould, with the advantages of decreasing the cycle times, saving energy and reducing the initial investment.

It is to be understood that the description discloses a preferred embodiment of the invention and that many constructional changes and modifications can be made thereto without departing from the underlying principle of the invention as described, illustrated and claimed hereinbelow. In the claims, the references between brackets are merely illustrative and not limitative of the scope of protection of the claims.

The invention claimed is:

1. A linear machine for blow moulding containers or other hollow bodies from a thermoplastic material, comprising:
at least one extruder extending along an axis of extension;
a first extrusion head fed by said at least one extruder and arranged laterally to said at least one extruder with respect to an axis of extension of at least one extruder; said extrusion head comprising a plurality of juxtaposed extrusion mouths, each adapted to extrude at least one parison;
a second extrusion head, arranged parallel and opposite to first extrusion head with respect to the axis of extension on the other side of the extruder; said second extrusion head comprising a plurality of juxtaposed extrusion mouths, each adapted to extrude at least one parison;
a first module operatively arranged below said extrusion head;
a second module operatively arranged below second extrusion head;
wherein each module comprises:
at least one pair of mould and counter-mould assemblies, each pair being operatively associated with a corresponding first or second extrusion head;
at least one pair of blowing stations adapted to blow air into the parison to form containers;
at least one pair of grippers for handling the containers as blown by the blowing stations;
a single conveyor for conveying the container products away from the machine; said conveyor extending along a direction of extension which is at least one of substantially parallel or coincident to the axis of extension of said extruder and being positioned vertically below said extruder;
wherein the first and second module being independent of each other and they can be alternately moved, operatively in mutual phase, along a corresponding axis parallel to the axis of extension for moving the corresponding mould and counter-mould assemblies, along with the respective grippers, for discharging the containers formed by the first and second module onto the same single conveyor positioned under the extruder.

2. A linear machine for blow moulding containers or other hollow bodies from a thermoplastic material, the machine comprising:
at least one extruder extending along an axis of extension
at least one extrusion head fed by said at least one extruder and arranged laterally to said at least one extruder with respect to its axis of extension; said extrusion head comprising a plurality of juxtaposed extrusion mouths, each adapted to extrude at least one parison;
said machine comprising a first module operatively arranged below said extrusion head,
a second module operatively arranged below second extrusion head;
wherein each module comprises:
at least one pair of mould and counter-mould assemblies, each pair being operatively associated with an extrusion head; each mould and counter-mould assembly comprising:
at least one press assembly comprising a mould and a counter-mould adapted to define a moulding cavity; and
a carriage for handling the press assembly in a direction substantially parallel to the direction of the axis of extension of said extruder;
at least one pair of blowing stations adapted to blow air into the parison to form containers;
one conveyor for collecting and moving the containers formed by said corresponding module away from the machine; and
detachable coupling means for integrally coupling said press assembly with said handling carriage.

3. The machine according to claim 1, wherein each extrusion head comprises a plurality of extrusion mouths arranged according to an axis which is substantially parallel to the axis of extension of said extruder to feed two modules.

4. The machine according to claim 1, further comprising a handling assembly for vertically translating said extruder or at least one portion thereof in a direction which is substantially parallel to its axis of extension.

5. The machine according to claim 1, further comprising a handling assembly comprising:
   at least one supporting frame for said extruder;
   at least one supporting bridge for supporting said extruder;
   at least two jacks operatively connected to said supporting frame for vertically translating said supporting bridge with respect to said supporting frame;
   at least one motor for driving said jacks.

6. Machine according to claim 5, wherein said handling assembly cyclically moves the extruder up and down along a vertical direction to prevent the parison products from swinging and interfering with the mould and counter-mould assemblies as they come out in a closed condition due to the cooperation with the head itself.

7. The machine according to claim 1, wherein the conveyor for collecting and moving away the container products is provided with grasping heads arranged on an axis parallel to that of said extruder.

8. The machine according to claim 5, further comprising a second head, arranged parallel and opposite to said head with respect to the axis on the other side of the extruder, under which a second module is arranged along with respective mould and counter-mould assemblies and respective grasping heads for discharging the containers formed by the second module onto the same collecting and handling conveyor positioned under the extruder.

9. The machine according to claim 7, wherein the grasping heads are mounted in pairs to at least one handling device which alternately places the grasping heads between a pick-up area located at an axis parallel to the axis and passing through the extrusion head, and a drop-off area at the collecting and handling conveyor where the containers are dropped.

10. The machine according to claim 2, wherein said removable coupling means comprise first holes adapted to engage coupling screws.

11. The machine according to claim 2, wherein said each carriage of a pair is timingly moved with the other carriage of the same pair in order to alternately move the respective press assembly under the extrusion head.

12. The machine according to claim 1, wherein each carriage of a pair is moved along a path with is substantially aligned with that of the other carriage but separated therefrom.

13. The machine according to claim 1, further comprising decoupling means to make the blowing stations removable with respect to the machine.

14. The machine according to claim 1, wherein the extruder is held stationary on a supporting structure along with a first portion of the extrusion head which divides the flow of plastic material from the extruder among several parallel channels for forming the plurality of parisons, there being provided an end portion of the extrusion head itself, comprising the mouths for extruding the parisons, which is connected to the outputs of said first portion of the head by means of respective flexible hoses, there being provided that only said end portion of the extrusion head of parisons is mounted on a vertical slide and moved in a substantially vertical direction.

15. The machine according to claim 1, comprising a second head arranged parallel and symmetrical to said head on the other side of the extruder, under which a second module is arranged along with respective mould and counter-mould assemblies and respective grasping heads for discharging the containers formed by the second module onto the same collecting and handling conveyor.

16. The machine according to claim 1, further comprising a third head under which a third module is arranged along with respective mould and counter-mould assemblies and respective grasping heads for discharging the containers formed by the third module onto the same collecting and handling conveyor.

17. The machine according to claim 16, further comprising a fourth head under which a fourth module is arranged along with respective mould and counter-mould assemblies and respective grasping heads for discharging the containers formed by the fourth module onto the same collecting and handling conveyor.

18. The machine according to claim 2, wherein each extrusion head comprises a plurality of extrusion mouths arranged according to an axis which is substantially parallel to the axis of extension of said extruder to feed two modules.

19. The machine according to claim 2, further comprising a handling assembly for vertically translating said extruder or at least one portion thereof in a direction which is substantially parallel to its axis of extension.

20. The machine according to claim 2, further including a handling assembly comprising:
   at least one supporting frame for said extruder;
   at least one supporting bridge for supporting said extruder;
   at least two jacks operatively connected to said supporting frame for vertically translating said supporting bridge with respect to said supporting frame;
   at least one motor for driving said jacks.

* * * * *